Oct. 16, 1928.
H. M. PRICE
1,687,791
CAN WASHING MACHINE
Filed July 23, 1925    12 Sheets-Sheet 7
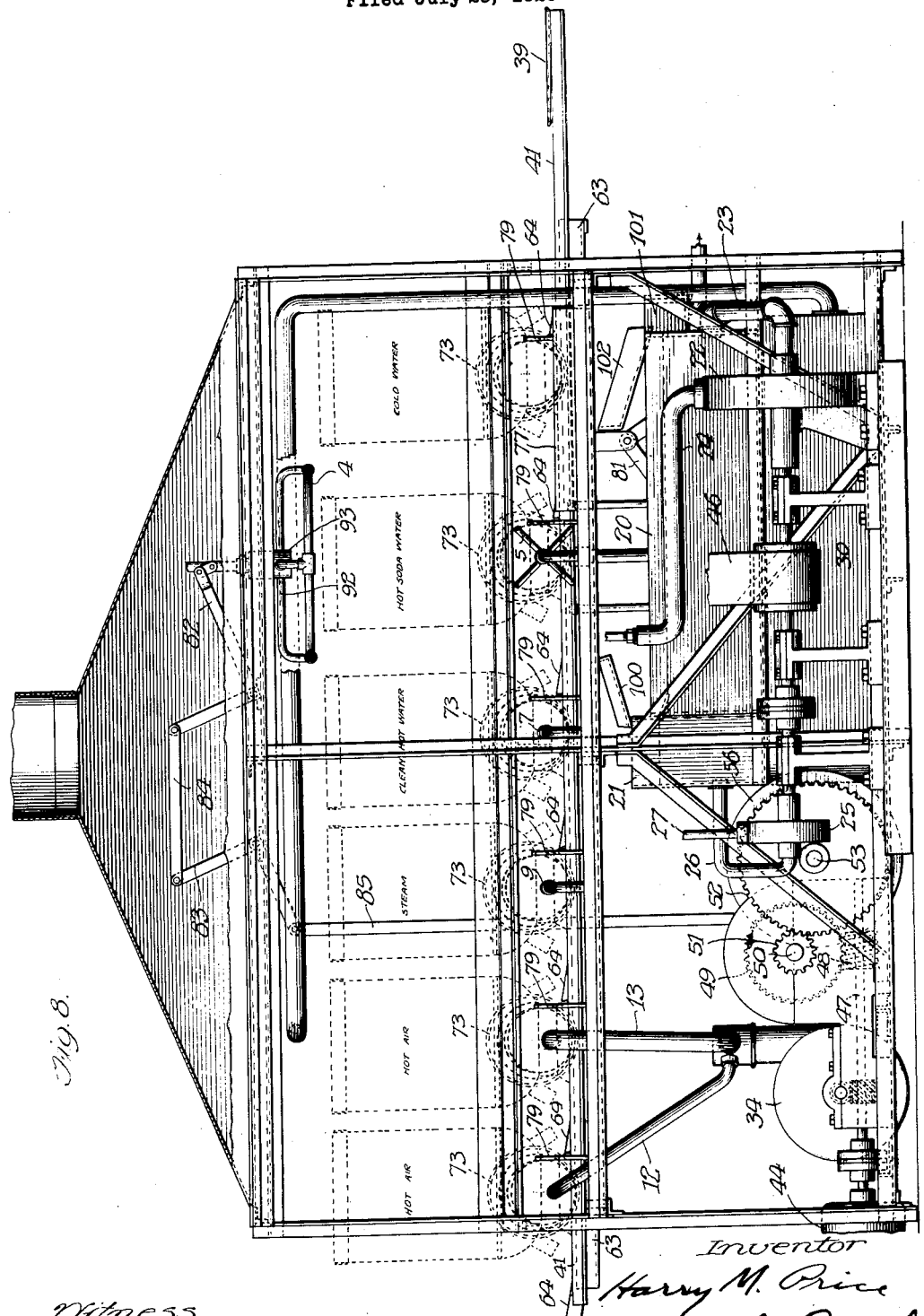

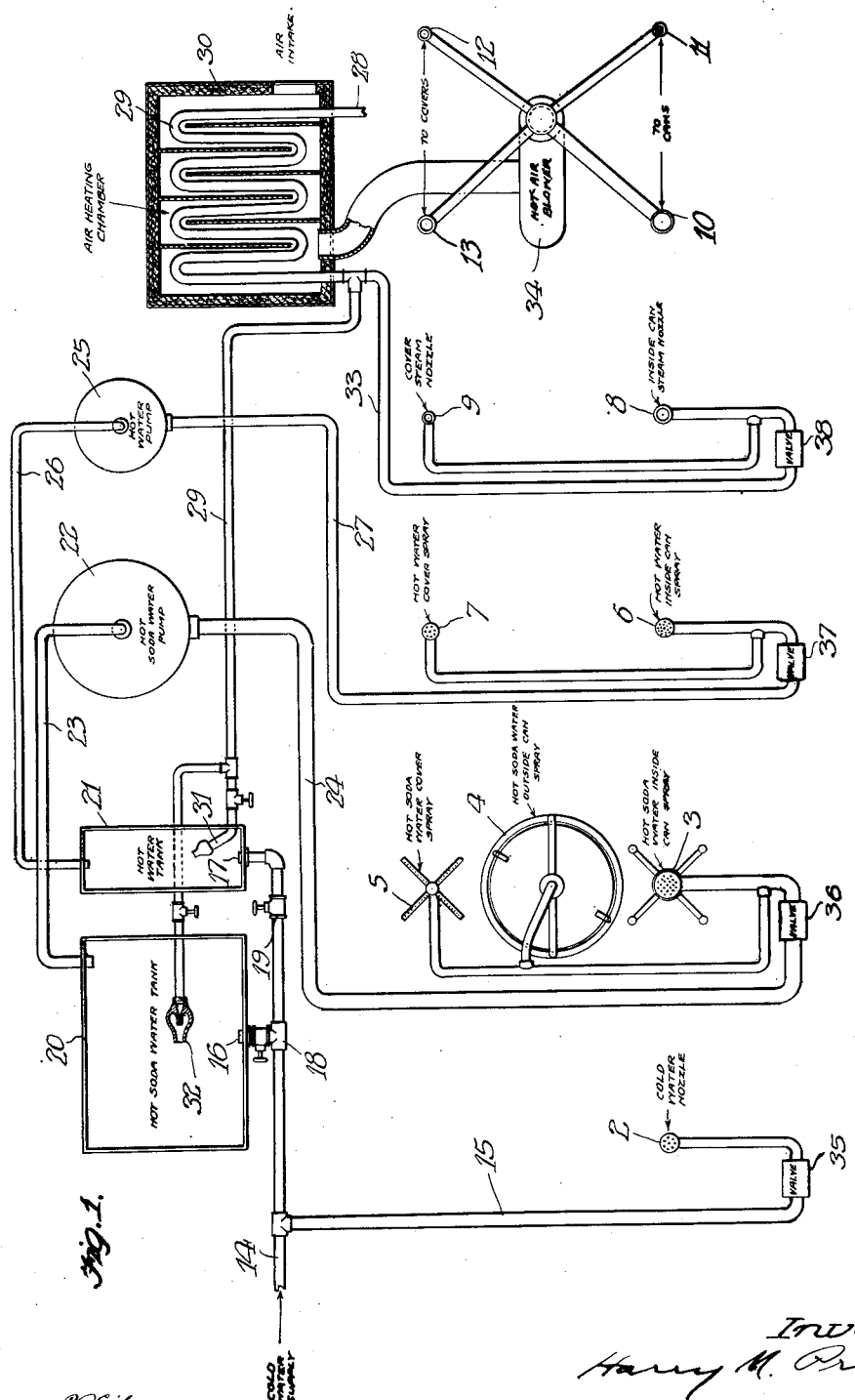

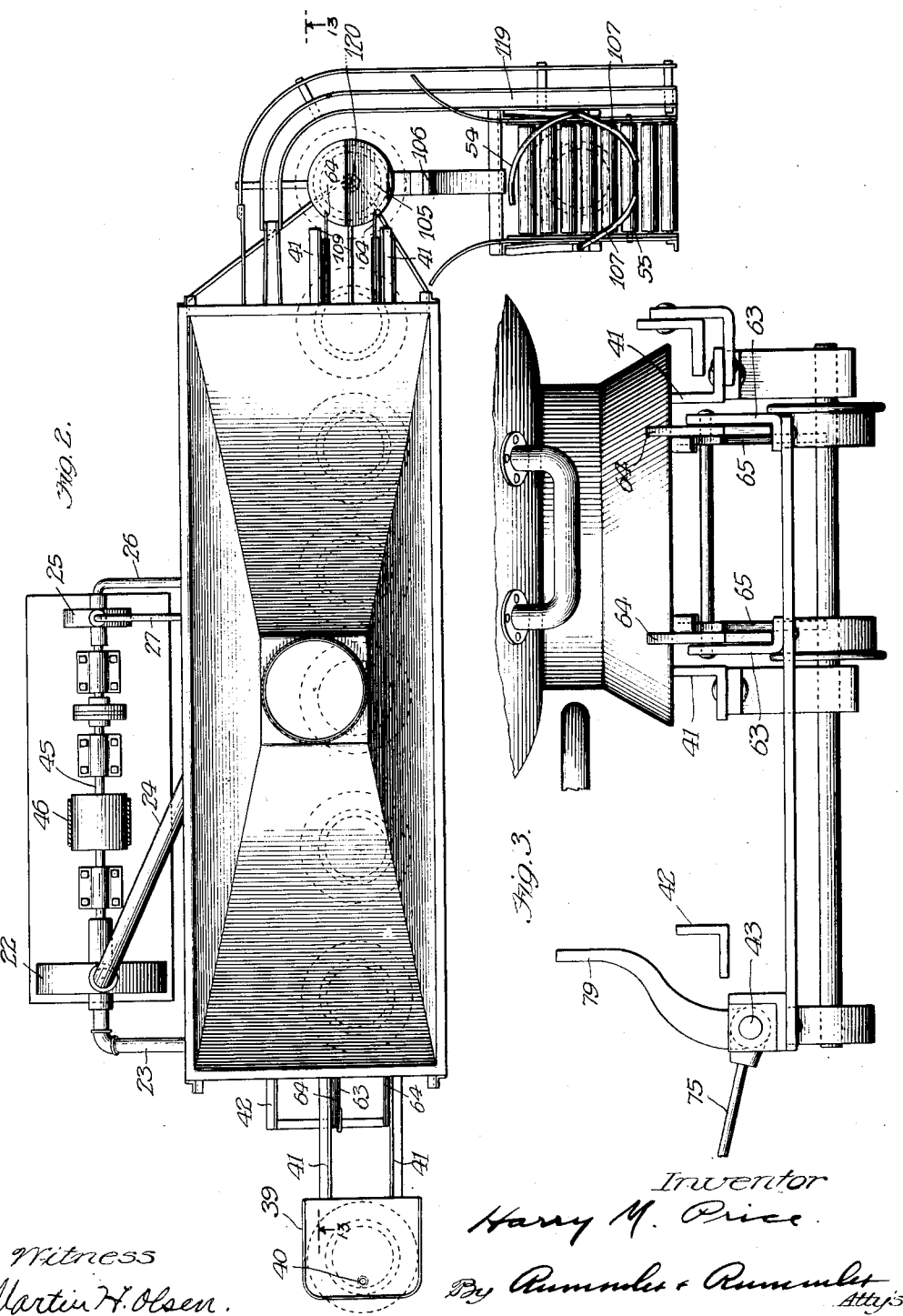

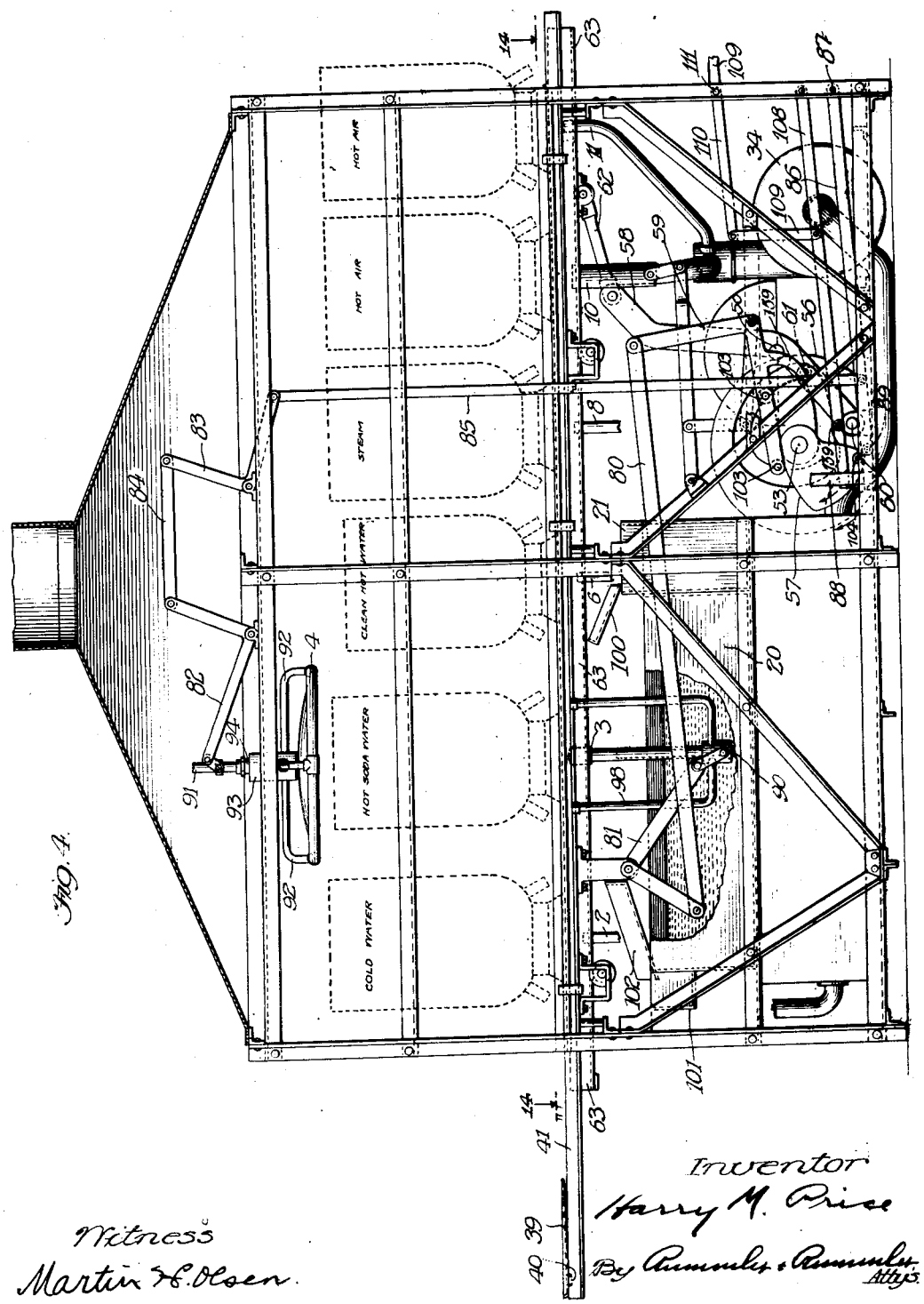

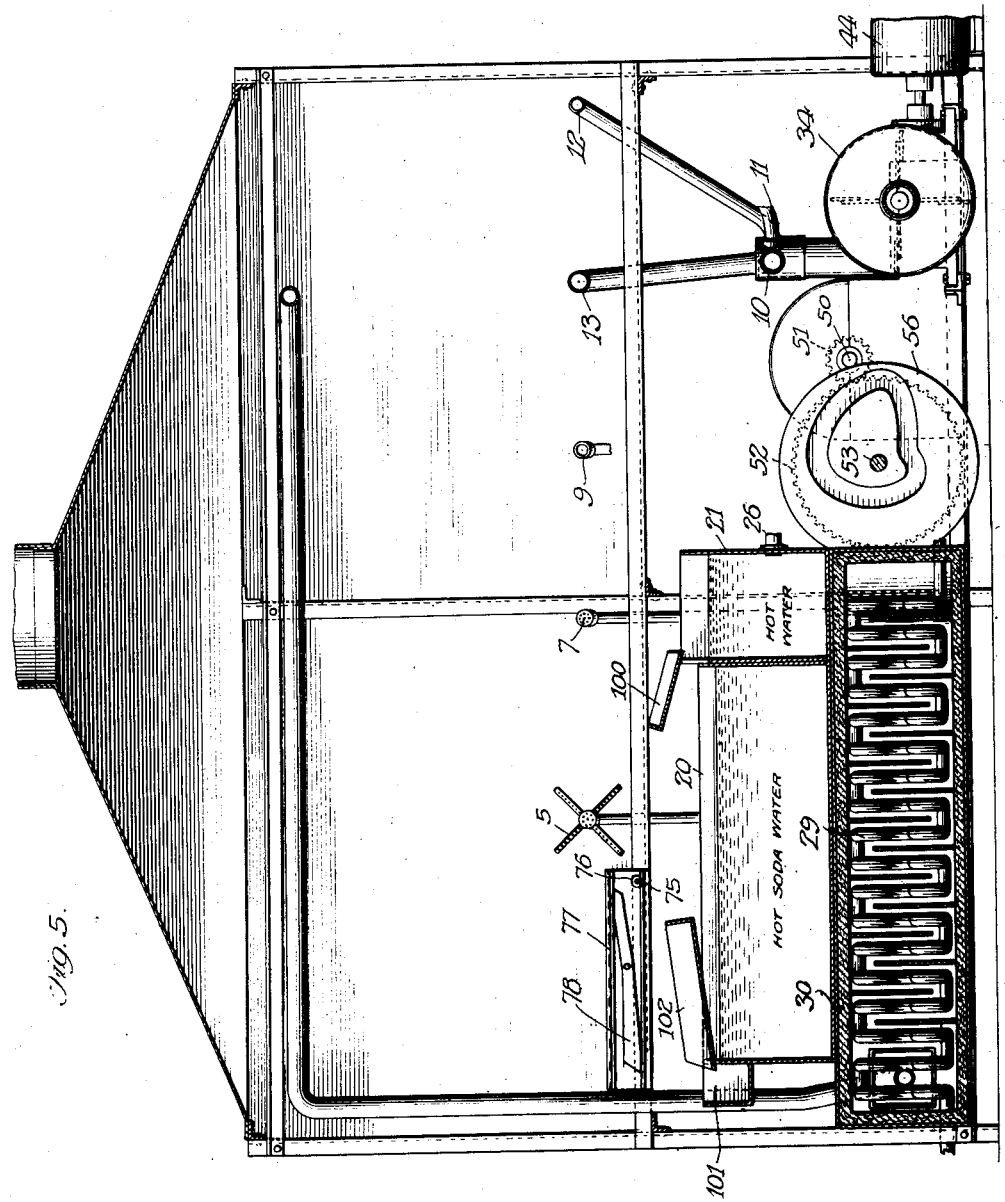

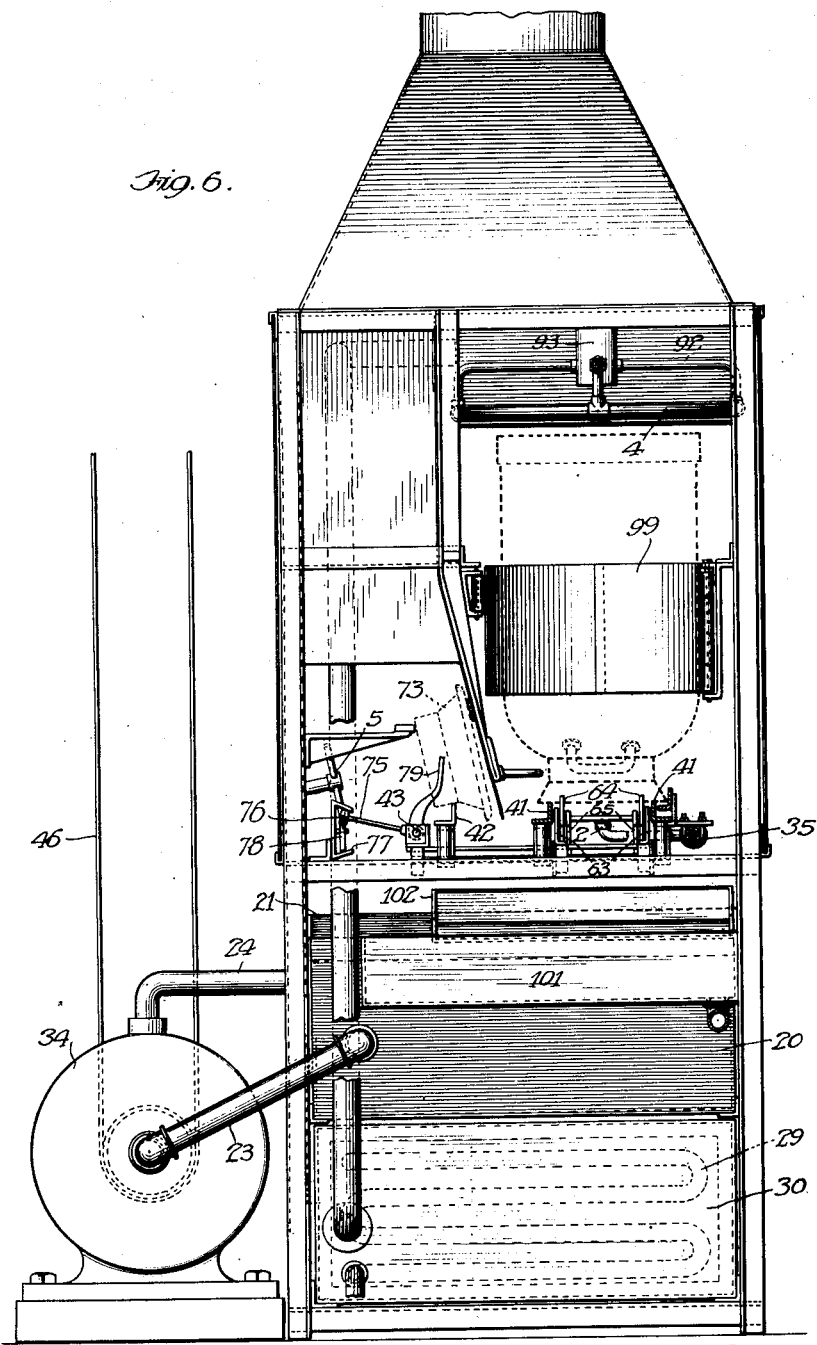

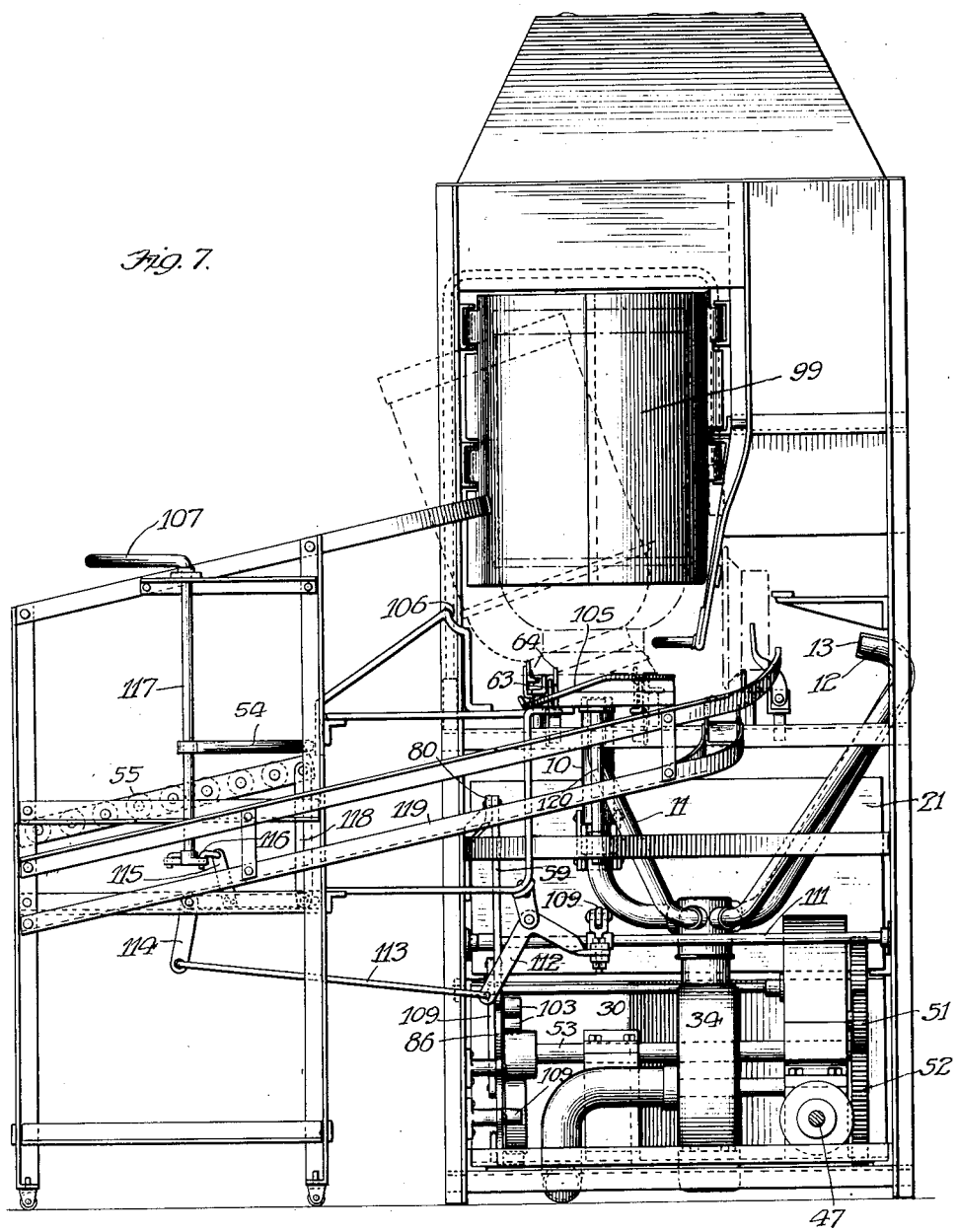

Oct. 16, 1928.
H. M. PRICE
1,687,791
CAN WASHING MACHINE
Filed July 23, 1925 12 Sheets-Sheet 8
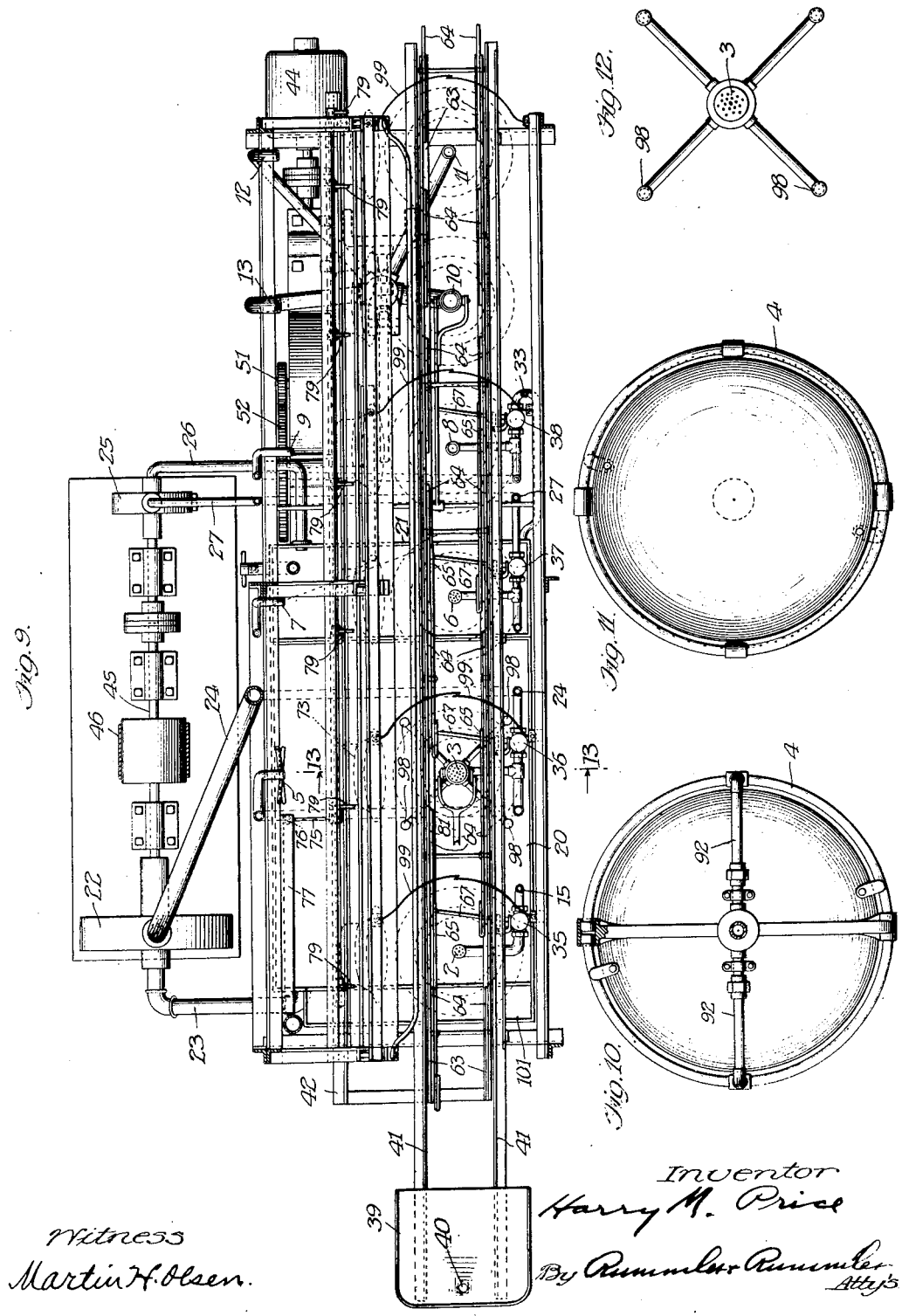
Witness
Martin H. Olsen.
Inventor
Harry M. Price
By Rummler & Rummler
Attys

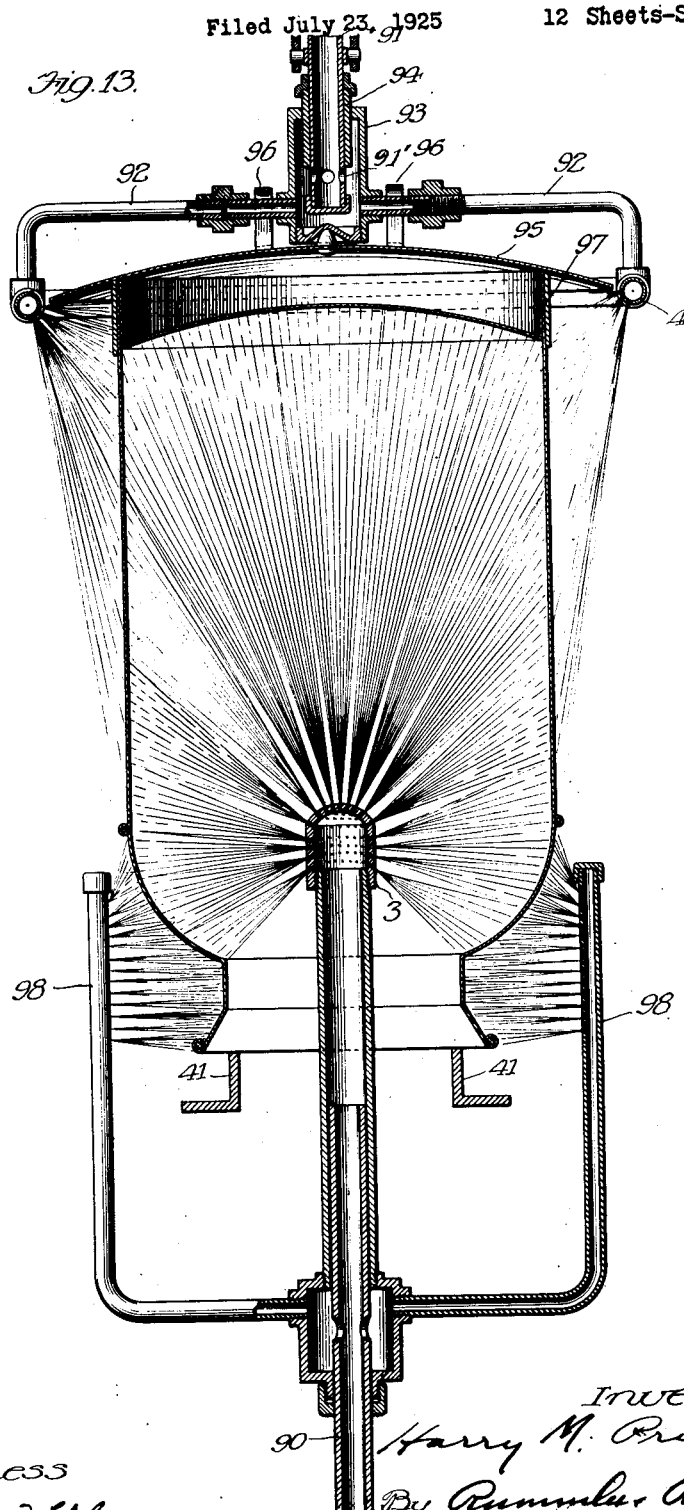

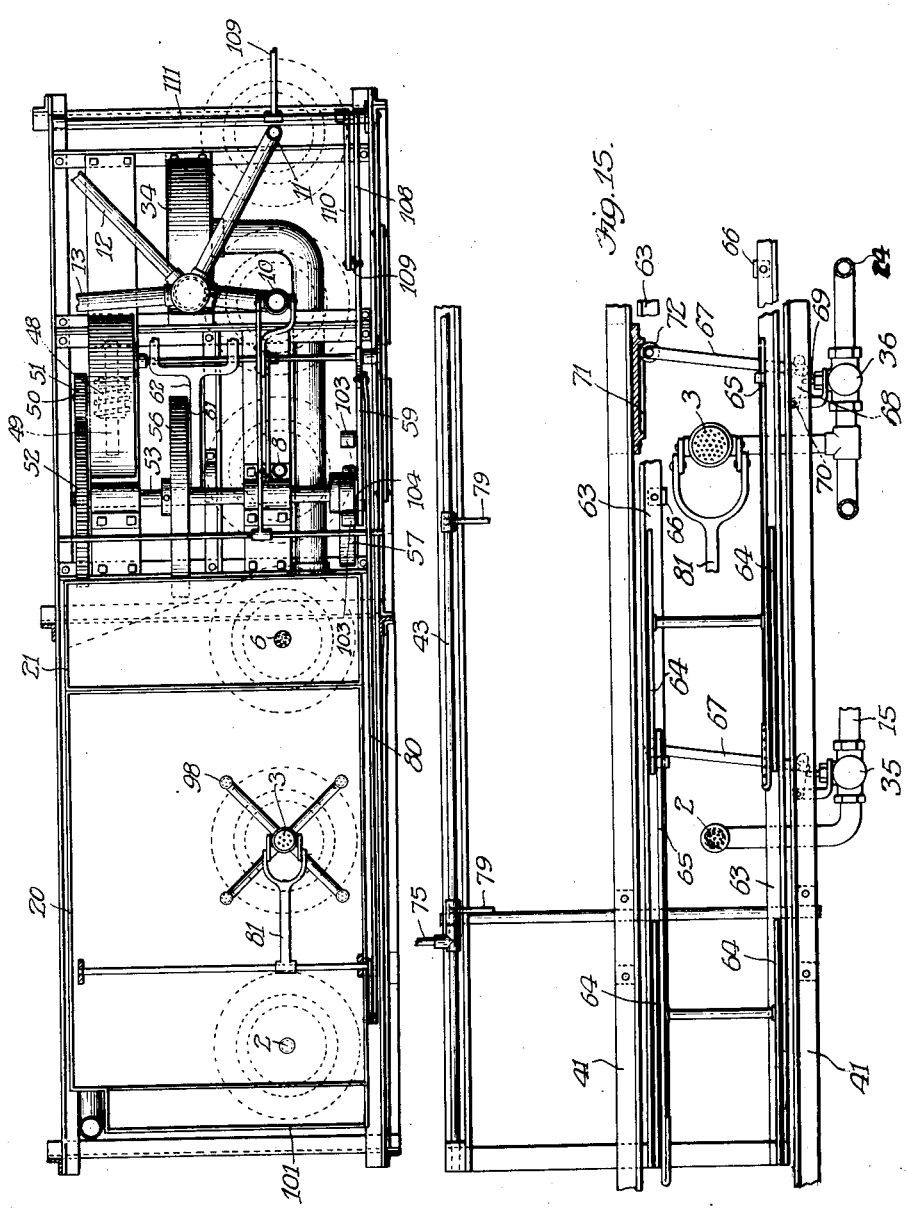

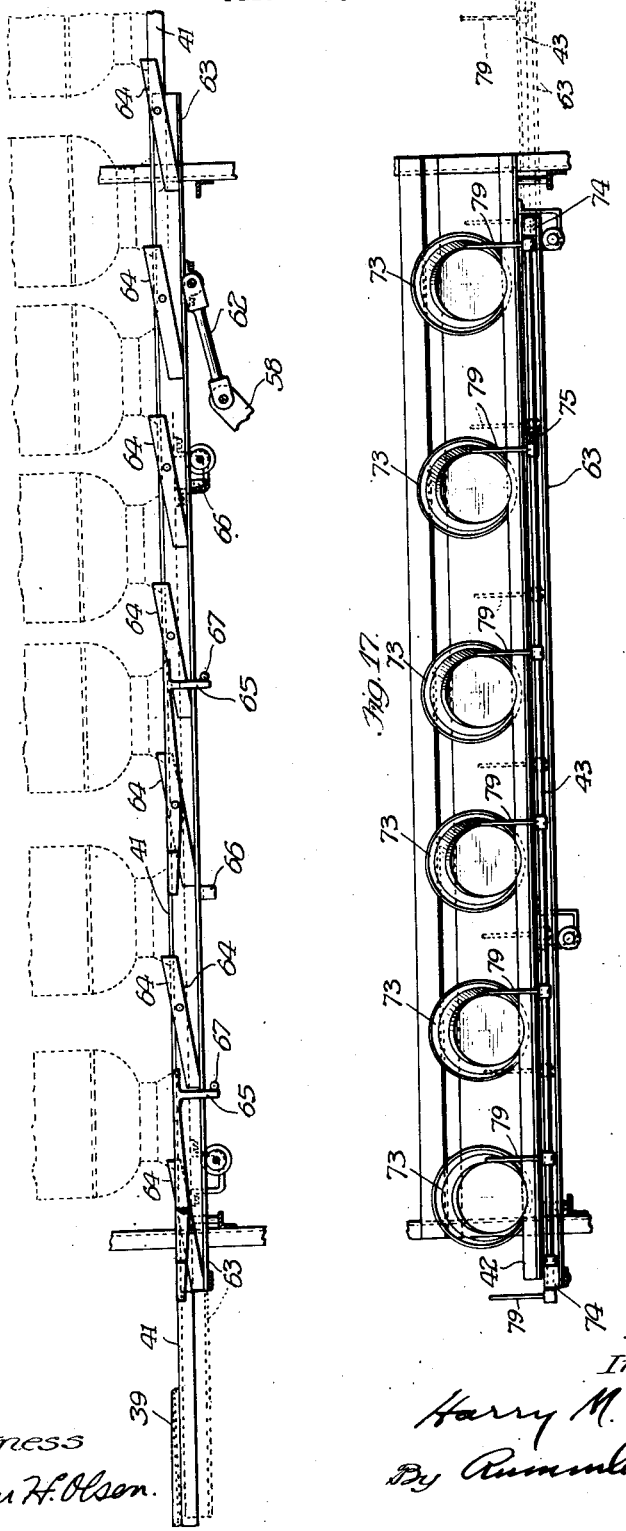

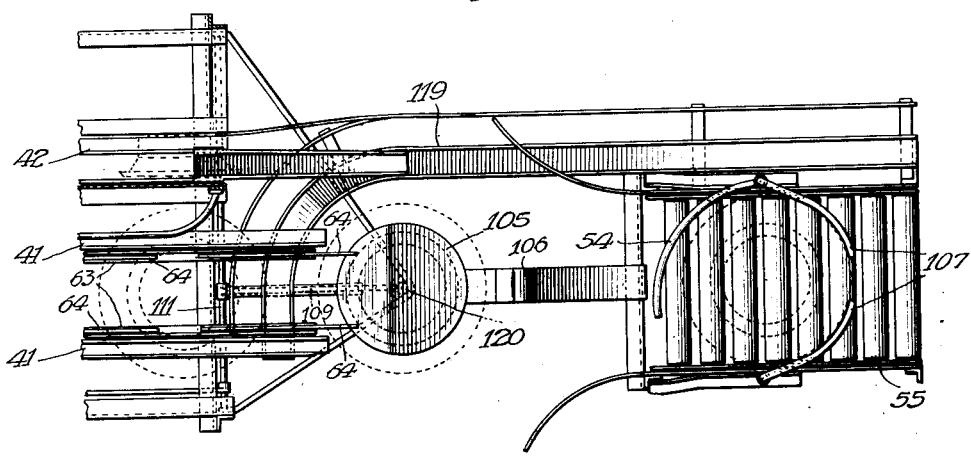
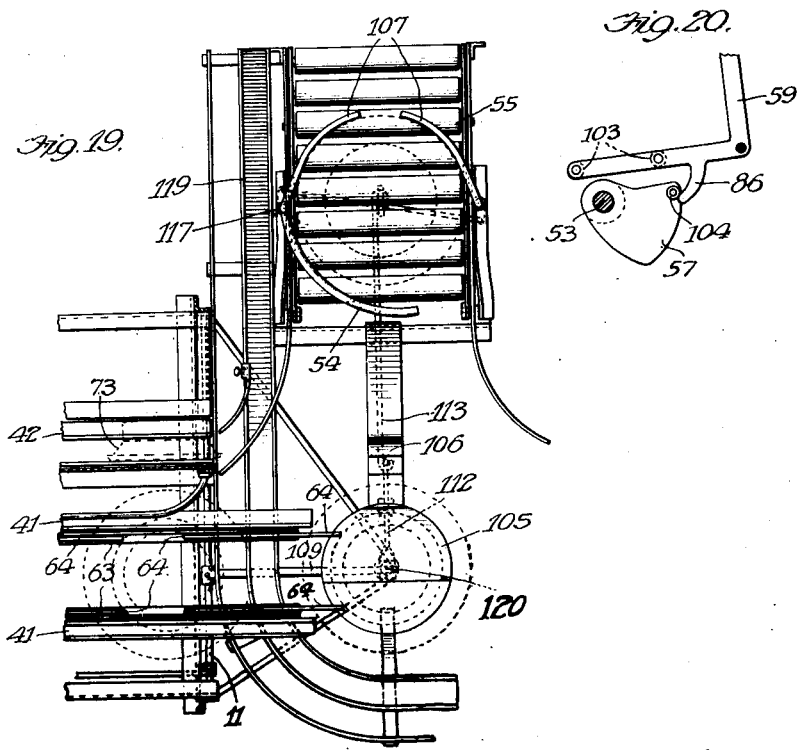

Patented Oct. 16, 1928.

1,687,791

UNITED STATES PATENT OFFICE.

HARRY M. PRICE, OF WAUKEGAN, ILLINOIS.

CAN-WASHING MACHINE.

Application filed July 23, 1925. Serial No. 45,557.

This invention relates to washing machines suitable for washing and sterilizing milk cans, ice cream cans and other similar containers.

The objects of the invention are particularly adapted to provide an improved spraying means for the purpose of more thoroughly cleansing the cans, and at the same time preventing the collection of water in the inwardly cupped bottom ends of the cans while in inverted position during their passage through the machine.

The objects of the invention are accomplished by a construction as illustrated in the drawings, in which:

Figure 1 is a diagram illustrating the arrangement of the different cleansing and sterilizing means and the fluid conduits and pumps.

Fig. 2 is a plan view of the machine as actually constructed.

Fig. 3 is a fragmentary detail in transverse elevation, showing the can supporting rails and feeding mechanism for the cans.

Fig. 4 is a side view of the machine with the discharge conveyer omitted and the hot soda water tank partly broken away.

Fig. 5 is a longitudinal section of the machine.

Fig. 6 is a front end view of the machine.

Fig. 7 is a rear end view of the machine.

Fig. 8 is a side view of the machine with the casing partly in section showing the opposite side to that shown in Fig. 4.

Fig. 9 is a plan view with the casing, hood, and discharge conveyer omitted.

Fig. 10 is a detail in plan of an annular washing spray conduit which is movable downwardly over the inverted cans as they arrive in position for being washed by this device.

Fig. 11 is a bottom view of the spraying conduit shown in Fig. 10.

Fig. 12 is a plan view of a spraying device movable upwardly into position for spraying the interior and exterior of the cans as they arrive in inverted position above this spray.

Fig. 13 is a sectional view in elevation of the spraying means taken through the center line of a can in the spraying position, and showing one of the cans in section.

Fig. 14 is a fragmentary plan view taken on the line 14—14 of Fig. 4.

Fig. 15 is a plan more in detail and somewhat enlarged of part of the mechanism shown in Fig. 14.

Fig. 16 is a detail in side elevation of a reciprocating mechanism for intermittently pushing inverted cans through the machine.

Fig. 17 is a detail side view of the mechanism employed for intermittently rolling the can covers along the guide.

Fig. 18 is a fragmentary plan view showing the discharge conveyer.

Fig. 19 also shows in plan a mechanism illustrated in Fig. 18, but with the conveyer swung into position to deliver the cans into a different direction.

Fig. 20 is a detail of the spray shifting cam.

The operations performed by this machine are substantially the same as with some other machines of the same general class, that is, the milk cans, after being emptied into a milk receiving vat, are successively placed upon a receiving platform in inverted position where the cans are first drained of as much as possible of the milk adhering to the surfaces thereof. The cans, with corresponding covers which are placed on a guide rail at one side of the can conveyer, are then automatically fed through the machine by an intermittent motion, first coming to rest at a station where the cans and covers are sprayed and rinsed with cold water; next the cans and covers come to rest in position where a thorough washing operation is performed before being successively moved to positions where they are rinsed, sterilized and dried. As customary, the spraying devices are automatically made inoperative during the traveling motion of the cans from station to station. Following these operations, the cans are successively deposited on an inclined disk or platform from which they tilt over an obstruction, causing the cans to be reversed into upright position and caught by a gate and pushing mechanism above a suitable conveyer. This conveyer and disk may be swung around a pivot located below the disk, in order to provide convenient means for tilting the cans and conveying them in any desired direction from the discharge end of the machine.

A feature of the machine presumed to be novel is the spraying arrangement for hot soda water or other cleansing fluid, including a movable hood or canopy, which, when a can comes into spraying position, is moved downwardly into engagement with the bottom flange of the can, while annular spraying means moves downwardly over the exterior of the can, and other spraying devices move upwardly at the inner and outer sides of the can. Another presumably novel improvement is the can discharging mechanism including a tilted platform or disk to which the cans are successively fed after the cleaning operation with their open ends still down, this disk being carried by a chute structure which may be adjusted around a pivot central to the disk in order to discharge the cans in any desired direction from the machine. There is also employed in connection with this tilted platform and chute arrangement, a fixed shoulder over which the can rolls to an upright position on to conveying rollers and into a trap consisting of horizontal gates and a kicker arm. A further feature of the last mentioned improvement is that the kicker arm operates when the gates are automatically opened to push the can along the set of rollers which are normally inclined, but which are further tilted as a unit at such time, in order to start the cans sliding down the same, even though the rollers may be frozen together, as occurs in some seasons. Specific features of the can and cover shifting mechanism and of the drive mechanism herein shown are also believed to be improvements in this class of machinery.

Referring to the drawings, Figure 1, which is a diagram, not actually corresponding with the arrangement in the machine as illustrated in the remaining drawings, shows the order of the relationship between the washing, rinsing, sterilizing and drying apparatus of the machine.

In this respect, the machine carries out the customary process of washing milk or ice-cream cans, etc. by first using a cold water rinsing spray 2, next a hot washing fluid is sprayed around and into the cans and their corresponding covers, by interior and exterior spray devices 3, 4 and 5. After the can and its cover are sprayed by the washing fluid, they are moved into position to be sprayed by hot rinsing water from spray devices 6 and 7. After this operation, the cans and covers are sterilized by steam from nozzles 8 and 9. Finally the cans and covers are dried by hot air blasts from nozzles 10 to 13.

The cold water supply conduit is indicated at 14, a branch conduit 15 therefrom leads to the cold water nozzle 2, and conduit 14 also has outlets 16 and 17 controlled by valves 18 and 19 for supplying water to the washing fluid tank 20 and a hot rinsing water supply tank 21.

A pump 22 draws the cleansing fluid from tank 20 through the conduit 23 and delivers it under considerable pressure through the conduit 24 to the spray devices 3, 4 and 5. A pump 25 draws the hot rinsing water through conduit 26 and discharges the water through a conduit 27 and nozzles 6 and 7.

A steam supply line is indicated at 28. Steam passes through an air heating coil 29 in the insulated chamber 30. The steam is also lead by conduit 29 to nozzles 31 and 32, in order to heat the water in the tank 21 and the washing fluid in tank 20. Another branch 33 from the steam line carries the steam to the sterilizing nozzles 8 and 9.

Air is drawn through the air heating chamber 30 by a blower 34 and the heated air is discharged against the articles operated upon by nozzles 10 to 13. The hot air blower 34 is operated continuously during the operation of the machine, but the nozzles or spray devices 2 to 9, which perform the washing and sterilizing operations are only operated at the time the cans and covers are at rest in corresponding stations and, therefore, are under the control of valves 35 to 38, these valves being automatically opened as the cans and the covers arrive at the different stations and closed as the cans leave these stations.

The plan view, Fig. 2, indicates various stations in the machine by the cans shown by broken lines. The cans are successively placed in inverted position upon a receiving platform 39, where they are drained of some of the milk adhering to the inner surfaces of the cans. This receiving platform is therefore provided with a drain outlet 40, so that this milk may be collected in a receptacle below the receiving platform. The cans rest upon rails 41 and are manually pushed from the receiving platform along these rails into position to be picked up by a reciprocating feeding mechanism, shown in Fig. 16, which serves to intermittently push the cans from station to station. The can covers are placed upon a rail 42 and are caused to roll along this rail in unison with the corresponding cans by the oscillating and reciprocating finger shaft 43, shown in Fig. 17. Aside from this can and cover feeding mechanism, mechanical motion is required merely for operating the pumps and blower and for shifting the spraying devices for the washing fluid, these devices being movable upwardly and downwardly into the most effective position with respect to the cans, as illustrated in Fig. 13.

Power for driving the machine is furnished mainly by a motor 44, Figs. 5, 8 and 9, although the washing fluid pump 22 and rinsing water pump 25 are operated by a pulley shaft 45 driven by belt 46, Fig. 2.

The motor 44 is coupled to a shaft 47 which carries a worm 48 for driving worm-wheel 49 on shaft 50.

Shaft 50 carries a pinion 51 meshing with a gear 52 on a cam shaft 53. The work performed by cam shaft 53 is to operate the can and cover feeding mechanisms shown in Figs. 16 and 17 and to raise and lower the spray devices for the washing fluid shown in Fig. 13. This shaft also has connections for operating the discharging mechanism, comprising the oscillating pusher arm 54 and the tiltable set of rollers 55, Figs. 7, 18 and 19. Shaft 53 rotates in the direction indicated by the arrows in Fig. 4 and carries a box cam 56 and a peripheral cam 57 for coacting respectively with a lever 58 for operating the can and cover feeding mechanisms and the bell crank lever 59, having connections for lifting and lowering the spraying devices 3 and 4 for the cleansing fluid.

The lever 58 is pivoted to the machine frame at 60 and carries a roller 61 extending into the groove of cam 56. At its upper end, it is connected by means of a link 62 to one of a pair of connected bars 63, reciprocated thereby and serving to feed or convey inverted cans along the rails 41. These bars rest upon rollers, and carry a plurality of pawls 64 normally held by their own weight at the angle indicated in Fig. 16. Therefore, in movement of the bars 63 rearwardly, or to the left in Fig. 16, the pawls ride under the cans and on the forward stroke engage the edges of the flared mouths of the can, pushing the cans the required distance along the supporting rails 41.

The bars 63 also carry valve operating pawls 65 and lugs 66 for engagement with valve operating members 67 respectively for opening and closing the valves. The pawls 65 are held in operative position by normally being depressed by the cans on the supporting rails 41. If no can is in position on the rails at the location of the pawls, the same will rock upwardly to ineffective positions. The valves are opened only at the time the cans come to rest in the corresponding stations and when the spray devices 3 and 4, Fig. 13, are shifted into the desired relationship with the cans. The means for operating the valves are also illustrated in Fig. 15. Upon the forward movement of the members 67, arms 68 pivotally connected therewith bear against the valve stems 69, shifting the valves to open position against their returning springs. Arms 68 are supported on pivots 70. Valve operating members 67 are guided by plates 71, having grooves within which extend rollers 72 on the ends of members 67. By this arrangement the valves are suddenly opened and closed after the members 67 are shifted past center, and not upon the beginning of the reciprocation of bars 63.

The covers 73, Fig. 17, are rolled along the guideway 42 by the oscillating and reciprocating finger shaft 43. This shaft is supported in bearings 74, carried by the reciprocating bar 63, and therefore reciprocates in unison with the bar, but is oscillated by means of an arm 75, Fig. 6, fast to shaft 43, carrying a roller 76, which, upon reciprocation of the bar 63, travels in the guideway 77 as controlled by the rocking cam 78, having beveled ends, as indicated in Fig. 5. In the forward movement of bars 63 and the shaft 43, the roller 76 rides up over the cam 78, and the shaft 43 is thereby rocked to cause the fingers 79 thereof to move into position for engaging the sides of the can covers, as shown in Fig. 6, and roll them along the rail 42. On the return motion of bars 63 and the shaft 43, roller 76 travels beneath the cam 78, and therefore the fingers 79 are held clear of the can covers.

The means, Fig. 4, for raising and lowering the spray devices 3 and 4 consists of the bell crank lever 59 coacting with cam 57 and having the link connection 80 with the bell crank lever 81 for the spray device 3. The upper spray device 4 for the washing fluid is connected with a lever 86 by the bell cranks 82 and 83 in links 84 and 85. Lever 86 is pivoted to the machine frame at 87 and at its forward end is guided in a slotted member 88. The lever 86 carries a roller 89 in position to be engaged by cam 57 at the required time for lifting the spray device 4. When the outer surface of the cam 57 clears the roller 89, the spray device 4 lowers by gravity into operative position.

The spray device 3 is positively moved in both directions by the cam 57 which coacts with the two rollers 103, on bell crank lever 59, for shifting this lever, while the roller 104 on the cam engages a bent arm 159 of the bell crank lever 59 for restoring it, as indicated in Fig. 20.

Figure 13 illustrates the specific construction of the spray devices 3 and 4. The spraying heads are slidably supported on the conduits 90 and 91. The spray device 4 consists of an annular perforated conduit supported by the radial conduits 92, affording communication with the cylindrical part 93 of the spraying head, which has a slidable bearing 94 on the conduit 91. A shield or canopy 95 is hung from the radial conduits 92 by the yokes 96 and, upon the lowering of the spray devices, the limit of movement of the canopy 95 is determined by the height of the can, while the spray head itself has a uniform movement. The canopy 95 serves to prevent the spraying liquid from collecting at the bottom of the cans inside of the supporting flange 97, and the cleansing fluid is not released until after the bottom of the cans are sealed because the ports 91' are normally closed and do not open until after the canopy bears against the bottom of the can.

The spray device 3 is provided with a plurality of perforated sprays 98 for spraying the breast and neck portions of the cans.

The washing fluids are prevented from splashing from one compartment of the machine to another by the gates 99, shown in Fig. 9. These gates are pushed open against spring action by the cans as they travel through the machine.

The washing and rinsing fluids drain into their respective supply containers, as shown in Fig. 4. The hot rinsing water falls into a trough 100 and tank 21. This tank overflows into tank 20 for the washing fluid, and tank 21 overflows into a collecting chamber 101, having a discharge outlet, the cold water, falling from cans in a position to be rinsed by cold water, is guided by a trough 102 into the collecting chamber 101.

The discharging mechanism for the clean cans is shown in Figs. 7, 18 and 19. From the drying station the cans are deposited upon an inclined platform 105, one side of the can striking a shoulder 106, as shown in Fig. 7, and falling over this shoulder into upright position upon a set of rollers 55, and inside of a trap, consisting of curved gate arms 107 and a kicker arm 54. These arms are rocked to allow the can to slide along the inclined set of rollers 55 by means of a lever 108, Fig. 4, having a roller 139 in position to be engaged by cam 57. When the lever 108 is depressed by the cam, it pulls downwardly upon a link 109 connected to a lever 110. This link is fast upon a transverse shaft 111 which also carries an arm 109, Fig. 7, for transmitting motion to a bell crank lever 112, connected by a link 113 to a bell crank lever 114. The bell crank lever 114 is connected by links 115 and 116 to the gate and kicker arm shaft 117. Bell crank lever 114 is also connected by a link 118 with the tiltable set of rollers 55, in order to oscillate the set of rollers at the time of discharging the can.

The covers roll out of the machine along the inclined rail 119 which forms a continuation of the rail 42. The discharge mechanism may be swung as a unit around a pivot 120, in line with the center of the tilted disk 105, as indicated in Figs. 18 and 19, in order that the cans may be discharged in different directions, as desired, for conveying them away to receiving trucks.

The operation of the machine has been pointed out in detail in the foregoing description, but briefly, and essentially, after each can is drained for a few moments on the receiving platform 39, is merely causing the cans to travel through the machine by a step by step motion and performing the necessary operation on the cans while at rest in the intervals between steps.

In the first station in the machine where the cans come to rest, they are subjected to cold water rinsing and next move on to a station, illustrated by Fig. 13, where the cans are subjected to a thorough washing operation by the spray devices 3 and 4, these being moved upwardly and downwardly into most effective positions by means of connections with cam shaft 53. These devices are moved away from the cans and the supply of washing fluid momentarily stopped, as the cans move on to the next station, where they are subjected to hot water rinsing; and then the cans are successively sterilized by steam and thoroughly dried by hot air, the moisture laden air being carried out of the machine through a vent at the top of the hood.

As the cans leave the machine, they are tripped into upright position when deposited upon the inclined disk 5 by striking the shoulder 106, Fig. 7. The cans are then conveyed away in the desired direction by the conveying mechanism shown in Figs. 18 and 19.

The covers are treated the same as the cans, being rolled from station to station simply by means of an oscillating and reciprocating finger shaft. Each can and its corresponding cover are discharged at the same time, provided each can and its cover are placed in the machine at the same time.

Although but one specific embodiment of this invention has been herein shown and described, it will be understood that numerous details of the construction herein shown may be altered or omitted without departing from the spirit of this invention as defined by the following claims.

I claim:

1. A can washing machine of the class described, having means for intermittently feeding the cans from one position to another in said machine, spraying means movable downwardly from above the cans into effective position for spraying the exterior of the end of the cans in one of said positions, and a canopy movable downwardly with said spraying means into position for preventing the spraying fluid from collecting in the cupped bottom ends of the cans.

2. A can washing machine of the class described, means for intermittently feeding the cans from one position to another in said machine, spraying means movable downwardly from above the cans into effective position for spraying the exterior of the end of the cans in one of said positions, said spraying means including an annular perforated conduit for surrounding the can, and a canopy movable downwardly with said last mentioned spraying means into position for preventing the spraying fluid from collecting in the cupped bottom ends of the cans.

3. In combination, in a can washing machine, means for positioning inverted cans at several stations in said machine, a circular spray member vertically movable above one of said stations and having a valve, a shield movably mounted on said member, said shield when held by contacting with a can being adapted to open said valve, and means for moving said member.

4. In combination, in a can washing machine, a movably mounted pipe having side outlet ports, a sleeve slidably mounted on said pipe adapted to normally close said ports, a spray member mounted on and connected to said sleeve, a spray fluid supply to said pipe, means for moving the pipe, and contacting means for stopping the sleeve to cause the pipe to move in the sleeve and open said ports.

5. In combination, in a can washing machine, a movably mounted pipe having side outlet ports, a sleeve slidably mounted on said pipe adapted to normally close said ports, a spray member mounted on and connected to said sleeve, a spray fluid supply to said pipe, means for moving the pipe, and a shield mounted on said sleeve adapted to contact and cover a portion of the can and stop the motion of the sleeve to cause said ports to be opened.

6. In combination, in a can washing machine having means for intermittently positioning inverted cans at several stations therein, spray heads for completely surrounding the cans at one of said stations, means for moving said heads into and out of surrounding relation with the can, and means for covering the upper end of the can.

7. In combination, in a can washing machine having means for intermittently positioning inverted cans at several stations therein, oppositely disposed spray heads for completely surrounding a can to simultaneously spray all sides of the same, said heads located at one of said stations, means for separating the heads to allow a can to pass through, means for moving the heads toward each other to pass over the ends of a can, and a cover attached to the upper spray head for covering the upper end of the can.

8. In combination, in a can washing machine of the class described, means for intermittently conveying an inverted can to several stations, a circular spray pipe above the can at one of said stations, a shield for protecting the bottom of the can from the spray, and means for lowering said pipe and shield onto the can.

9. In a can washing machine, a circular spraying head, means for moving the spraying head to surround the end of an inverted can, said spraying head having jet openings for washing the sides of cans, and means simultaneously moved with the spraying head into relation with the can for protecting the bottom of the can from the spray.

Signed at Chicago this 20th day of July, 1925.

HARRY M. PRICE.